(12) United States Patent
Kumar et al.

(10) Patent No.: US 8,401,993 B2
(45) Date of Patent: Mar. 19, 2013

(54) ANALYTICS INTEGRATION SERVER WITHIN A COMPREHENSIVE FRAMEWORK FOR COMPOSING AND EXECUTING ANALYTICS APPLICATIONS IN BUSINESS LEVEL LANGUAGES

(75) Inventors: Manoj Kumar, Yorktown Heights, NY (US); Yuan Chi Chang, Bayside, NY (US); Chung-Sheng Li, Scarsdale, NY (US)

(73) Assignee: International Business Machines Corporation, Armonk, NY (US)

(*) Notice: Subject to any disclaimer, the term of this patent is extended or adjusted under 35 U.S.C. 154(b) by 222 days.

(21) Appl. No.: 12/559,388

(22) Filed: Sep. 14, 2009

(65) Prior Publication Data

US 2011/0066457 A1   Mar. 17, 2011

(51) Int. Cl.
*G06F 7/00* (2006.01)
(52) U.S. Cl. .................... 707/607; 705/7.11
(58) Field of Classification Search ............ 707/600, 707/607; 705/7
See application file for complete search history.

(56) References Cited

U.S. PATENT DOCUMENTS

| | | | | |
|---|---|---|---|---|
| 5,991,743 A * | 11/1999 | Irving et al. | ............... | 705/36 R |
| 6,609,123 B1 | 8/2003 | Cazemier et al. | | |
| 6,963,826 B2 * | 11/2005 | Hanaman et al. | ............... | 703/2 |
| 7,373,633 B2 * | 5/2008 | Kraiss et al. | ............... | 717/110 |
| 7,444,342 B1 * | 10/2008 | Hall et al. | ............... | 1/1 |
| 7,448,048 B1 * | 11/2008 | Nesamoney et al. | ......... | 719/318 |
| 7,523,106 B2 * | 4/2009 | Russell et al. | ............... | 1/1 |
| 7,630,956 B2 * | 12/2009 | Wyatt et al. | ............... | 1/1 |
| 7,634,397 B2 * | 12/2009 | Suen et al. | ............... | 704/8 |
| 7,813,947 B2 * | 10/2010 | DeAngelis et al. | ......... | 705/7.28 |
| 7,945,438 B2 * | 5/2011 | Balmelli et al. | ............... | 704/10 |
| 2003/0061246 A1 * | 3/2003 | Bowman et al. | ............... | 707/204 |
| 2003/0084053 A1 * | 5/2003 | Govrin et al. | ............... | 707/100 |
| 2004/0093344 A1 | 5/2004 | Berger et al. | | |
| 2004/0093559 A1 | 5/2004 | Amaru et al. | | |
| 2004/0138933 A1 * | 7/2004 | LaComb et al. | ............... | 705/7 |
| 2004/0216030 A1 | 10/2004 | Hellman et al. | | |
| 2005/0027683 A1 * | 2/2005 | Dill et al. | ............... | 707/2 |
| 2005/0256892 A1 | 11/2005 | Harken | | |
| 2007/0174308 A1 | 7/2007 | Rausch | | |
| 2011/0066589 A1 | 3/2011 | Chang et al. | | |
| 2011/0066590 A1 | 3/2011 | Chang et al. | | |

* cited by examiner

*Primary Examiner* — Shahid Alam
*Assistant Examiner* — Joshua Bullock
(74) *Attorney, Agent, or Firm* — Patterson & Sheridan, LLP

(57) ABSTRACT

Systems, methods and articles of manufacture are disclosed for building and executing analytics solutions. Such a solution may provide a comprehensive analytics solution (e.g., a risk assessment, fraud detection solution, dynamic operational risk evaluations, regulatory compliance assessments, etc.). The analytics solution may perform an analytics task using operational data distributed across a variety of independently created and governed data repositories in different departments of an organization. A framework is disclosed which allows a user (e.g., a risk analyst) to compose analytical tools that can access data from a variety of sources (both internal and external to an enterprise) and perform a variety of analytic functions.

18 Claims, 11 Drawing Sheets

ANALYTICS INFORMATION AND SERVICES DIRECTORY

BUSINESS GLOSSARY TO PHYSICAL SOURCE MAPPING

| BG | PHYSICAL STORE | TECH. & OP. METADATA |
|---|---|---|
| INTEREST RATE SWAP | SWAP DB | |
| LIBOR | BLOOMBERG | |
| 10-YEAR TREASURY | BOND DESK | |

DATA TRANSPORT FUNCTIONS/SERVICE

| BG | SOURCE STORE | TARGET STORE | MOVE FUNCTION |
|---|---|---|---|
| ISwapToVaR | SWAP DB | BDW | DIRECT COPY |
| LIBORToVaR | BLOOMBERG | BDW | TIME PERIOD |
| BONDToVaR | BOND DESK | BDW | TIME PERIOD |

ANALYTICS SERVICES DIRECTORY

| BG | TARGET STORE |
|---|---|
| C-F VaR | BDW |
| LINEAR VaR | BDW |
| MONTE CARLO VaR | BDW |

FIG. 3B

ANALYTICS INTEGRATION SERVER WITHIN A COMPREHENSIVE FRAMEWORK FOR COMPOSING AND EXECUTING ANALYTICS APPLICATIONS IN BUSINESS LEVEL LANGUAGES

BACKGROUND

1. Field of the Invention

Embodiments of the invention relate to a comprehensive framework for composing and executing analytics applications in business level languages. The comprehensive framework may include an information and services directory, an analytics integration workbench, and an analytics integration server.

2. Description of the Related Art

Comprehensive risk assessment or fraud detection, and analytics applications in general, require access to operational data which may be distributed across independently created and governed data repositories in different departments of an organization. For example, an analytics solution may require data from multiple distributed repositories, external relational or structured sources, internal and external sources of unstructured and semi-structured information, real time external sources such as market data feeds, and real time internal sources such as application and information technology infrastructure events. Further, a particular analytics solution may require that data from these separately managed data sources be fused or combined to create a complete and trusted view to derive better insights.

Getting data from these diverse sources to the warehouse and data marts is often a complicated task. For example, a data architect for risk information may collaborate with a risk analyst to identify what data (often defined using industry standard models or glossaries, which provide a standardized taxonomy of risk data in business terms) and additional risk data (in terms of business level descriptions) should be provisioned in a data warehouse or OLAP cube for use by an analytics application. Once the needed information is identified, the data architect generates schemas for the data in the data warehouse and schemas for OLAP dimensional tables. The architect may then work with the database software developers to compose the data movement scripts (ETL programs) to actually move the data from their respective sources within the enterprise to the data warehouse. That is, the programs to actually obtain the data needed by the analytics solution are created. Once the ETL programs are developed and deployed, the ETL processes may be used to populate the data warehouse and OLAP cube. Only then may the risk analyst access data from the warehouse as needed for a given analytics solution. For example, data from the warehouse are populated in the OLAP cube and data marts for use in various reports and dashboards.

Given this wide distribution of data, a large percentage of the resources devoted to a typical analytics solution are spent in provisioning data for the analytics application.

SUMMARY

One embodiment of the invention includes a computer-implemented method for executing an analytics solution expressed in a business level language. The method may generally include receiving a script generated from the analytics solution expressed in the business level language. The script may include a plurality of references to elements listed a business glossary. The method may further include identifying one or more statements in the script ready for execution and dereferencing, in the identified one or more statements, the references to elements listed in the business glossary. At least a first reference is to an element in the business glossary associated with a mapping specifying a function invoked to move data from an underlying data source to a target data store. At least a second reference is to an analytics tool in the business glossary configured to operate on the moved data. The second reference is associated with a mapping specifying an instantiation of the analytical tool provided within an enterprise network infrastructure. The method may also include executing, by operation of a processor, the identified one or more statements.

Another embodiments of the invention includes a computer-readable storage medium containing a program which, when executed by a processor, performs an operation for executing an analytics solution expressed a business level language. The operation may generally include receiving a script generated from the analytics solution expressed in the business level language. The script includes a plurality of references to elements listed a business glossary. The operation may also include identifying one or more statements in the script ready for execution and dereferencing, in the identified one or more statements, the references to elements listed in the business glossary. At least a first reference is to an element in the business glossary associated with a mapping specifying a function invoked to move data from an underlying data source to a target data store. At least a second reference is to an analytics tool in the business glossary configured to operate on the moved data. The second reference is associated with a mapping specifying an instantiation of the analytical tool provided within an enterprise network infrastructure. The operation may also include executing the identified one or more statements.

Another embodiment of the invention includes a system having one or more computer processors and a memory containing a program, which when executed by the one or more computer processors is configured to perform an operation for composing an analytics solution. The operation may generally include receiving a script generated from the analytics solution expressed in the business level language. The script includes a plurality of references to elements listed a business glossary. The operation may also include identifying one or more statements in the script ready for execution and dereferencing, in the identified one or more statements, the references to elements listed in the business glossary. At least a first reference is to an element in the business glossary associated with a mapping specifying a function invoked to move data from an underlying data source to a target data store. At least a second reference is to an analytics tool in the business glossary configured to operate on the moved data. The second reference is associated with a mapping specifying an instantiation of the analytical tool provided within an enterprise network infrastructure. The operation may also include executing the identified one or more statements.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIGS. 3A-3B further illustrate the analytics Information and services directory, according to one embodiment of the invention.

DETAILED DESCRIPTION OF THE PREFERRED EMBODIMENTS

Figure 1:
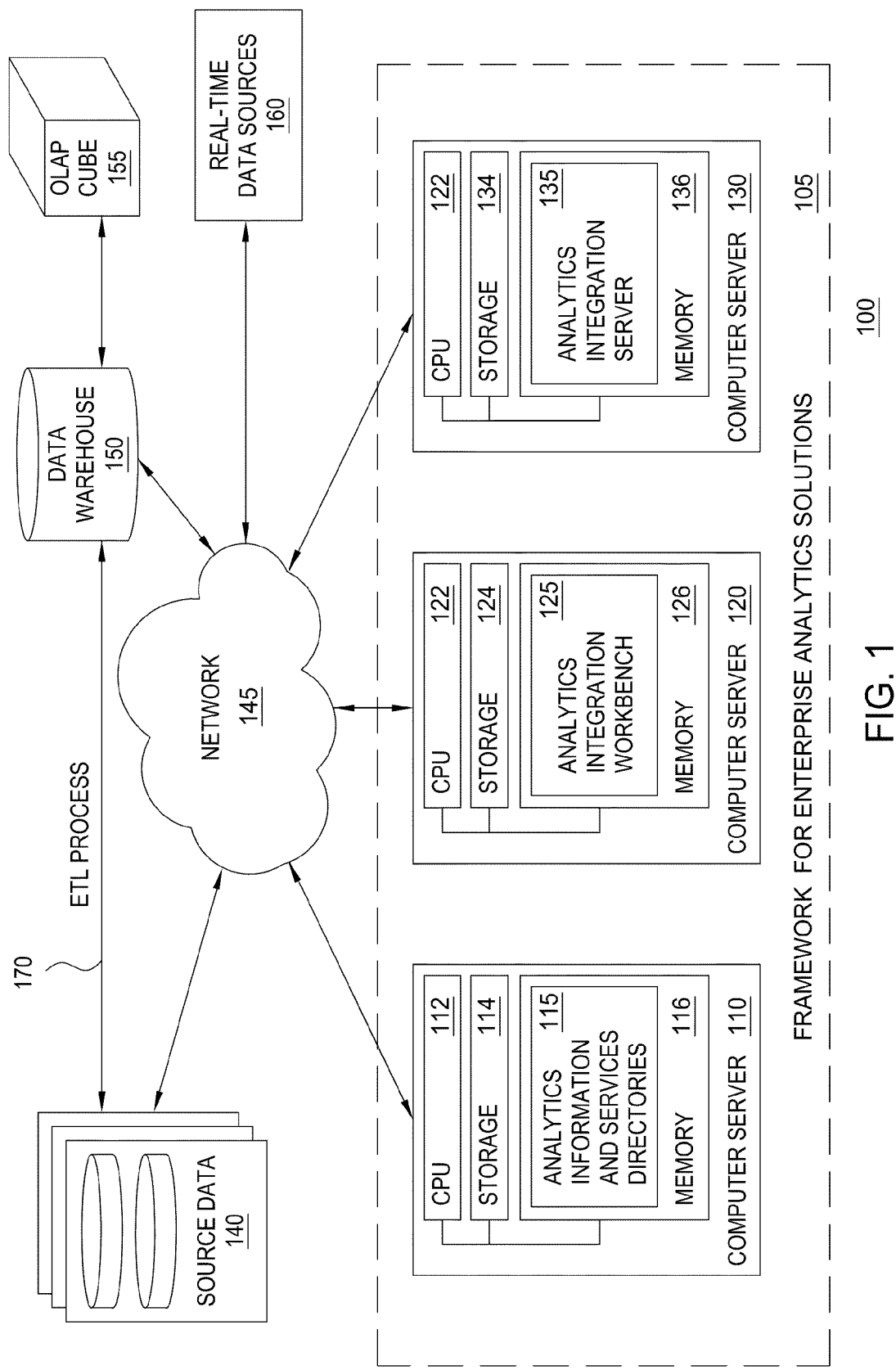
FIG. 1 illustrates an example of an enterprise computing infrastructure, according to one embodiment of the invention.

Embodiments of the invention provide systems and methods for building and executing analytics solutions. Such a solution may provide a comprehensive analytics solution (e.g., a risk assessment, fraud detection solution, dynamic operational risk evaluations, regulatory compliance assessments, etc.). The analytics solution may perform an analytics task using operational data distributed across a variety of independently created and governed data repositories in different departments of an organization. That is, embodiments of the invention provide a framework which allows users (e.g., a risk analyst) to compose analytical tools that can access data from a variety of sources (both internal and external to an enterprise) and perform a variety of analytic functions. As described in greater detail herein, in one embodiment, the framework includes three components: an analytics Information and services directory, an analytics integration workbench, and an analytics integration server.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Further, particular embodiments of the invention will be described with respect to risk analysis. However, it should be understood that the invention more broadly relates to analytics, generally. Accordingly, references to risk analysis are merely illustrative and not limiting.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates an example of an enterprise computing infrastructure 100, according to one embodiment of the invention. As shown, the computing infrastructure 100 includes a framework 105 for enterprise analytics solutions, source data 140, a data warehouse 150 and OLAP cube 155, and real time data sources 160, all connected by a network 145. In general, the network 145 may be any form of data communications network, including a local and/or a wide area network (WAN) infrastructure used to connect data sources within an enterprise. In a particular embodiment, the network 145 includes data communications sent over the Internet.

The source data 140 is representative of any available data source from the enterprise computing infrastructure 100. For example, data sources 140 may include multiple relational data repositories and operational data stores, structured and unstructured data sources (e.g., document collections), external relational or structured sources, internal and external sources of unstructured and semi-structured information, real time sources 160 such as external market data feeds or internal sources such as application and information technology infrastructure event monitoring. More generally, source data 140 represents any information stream that may be provisioned via an extract transform and load (ETL) process (represented by an arrow 170) or otherwise made available in the data warehouse 150 and OLAP cube 155.

Illustratively, the framework 105 is shown to include three computer server systems 110, 120, and 130, each including a CPU 112, 122, 132, storage 114, 124, 134, and a memory 114, 124, and 126. The computer systems 110, 120, 130 are included to be representative of a variety of computing devices, including stand alone server systems, virtualized systems, server blades or rack mounted servers, as well as virtual computing systems accessed through a cloud-based computing infrastructure, etc. In general, the computer server systems 110, 120, and 130 are each under the control of an operating system (not shown). Well known examples of operating systems include UNIX, versions of the Microsoft Windows® operating system, and distributions of the Linux® operating system (Note: Linux is at trademark of Linus Torvalds in the United States and other countries.) Of course any operating system supporting the functions disclosed herein may be used.

The processors 112, 122, and 124 are included to be representative of a single CPU, multiple CPUs, a single CPU having multiple processing cores, and the like. The memory 116, 126, and 136 may be a random access memory. While the memory 106 is shown as a single entity, it should be understood that the memory 116, 126, and 136 may comprise a plurality of modules, and that the memory 116, 126, and 136 may exist at multiple levels, from high speed registers and caches to lower speed but larger DRAM chips. The storage 114, 124, and 134 may be a hard disk drive storage device. Although the storage 114, 124, and 134 is shown as a single unit, the storage 114, 124, and 134 may be a combination of fixed and/or removable storage devices, such as fixed disc drives, floppy disc drives, tape drives, removable memory cards, or optical storage.

Illustratively, the memory 116 of computer server 110 includes an analytics information and services directory 115, the memory 126 of computer server 120 includes an analytics integration workbench 125, and the memory 136 of computer server 130 includes an analytics integration server 135. As described in greater detail herein, these applications collectively provide the framework 105 for composing and executing analytics applications in business level languages. That is, using the terms and descriptions for information and applications customarily understood by a risk analyst or appropriate business level person, as opposed to the underlying data sources, databases, and application implementations used within a particular enterprise and understood by programmers, systems architects and data analysts Of course, one of ordinary skill in the art will recognize that the analytics information and services directory 115, the analytics integration workbench 125, and the analytics integration server 135 are shown executing on separate computer systems 110, 120, and 130 for clarity and that these applications may be configured to execute on a variety of different computing platforms. And further, the functionality described for these components may be combined (or further subdivided) in a variety of ways.

Figure 2:
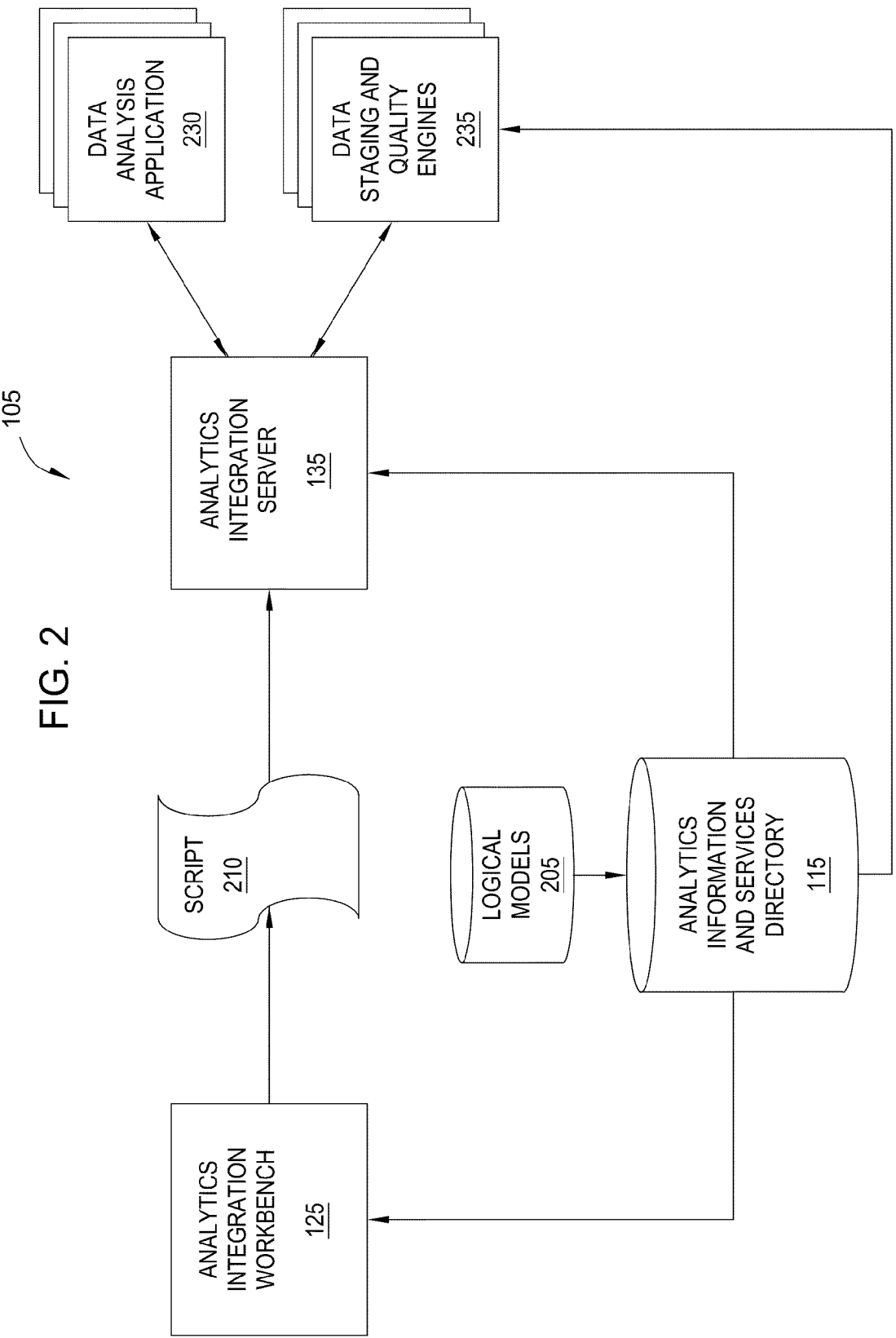
FIG. 2 is a block diagram further illustrating the framework for composing and executing analytics applications in business level languages first shown in FIG. 1, according to one embodiment of the invention.

FIG. 2 is a block diagram further illustrating the framework 105 for composing and executing analytics applications in business level languages first shown in FIG. 1, according to one embodiment of the invention. As shown, the framework 105 includes the analytics information and services directory 115, the analytics integration workbench 125, and the analytics integration server 135.

In one embodiment, the analytics information and services directory 115 maintains a set of business level definitions of data and analytics applications available to the risk analyst, e.g., a business glossary and a service vocabulary describing the available data and analytics services that may be included in a given analytics solution. The information and services directory 115 also maintains mappings from the business level definitions to the actual implementation or instantiation of the data and applications within the enterprise. For example, a mapping be stored as records in a data database matching a particular business level definition in the business glossary and an underlying data source where data corresponding to the definition may be located. Similarly, for common business analytics methods (e.g., Monte Carlo methods) may be mapped to an instantiation of the analytical tool provided within an enterprise network infrastructure. Thus, the analytics information and services directory 115 provides a formalized definition of what data streams and data analysis tools are available for a given enterprise, and such information may generally be provided in a language used by the risk analyst. The analytics information and services directory 115 also provides information to other components of the framework as needed to map from the business level definitions to the actual data and analytic tools listed in the directory 115. By abstracting out the underlying data and process infrastructure, the analytics information and services directory 115 provides a set of components that is standardized and understandable by the risk analyst, but that is also extendable and reusable. In one embodiment, the terms in the information and services directory 115 may be based on a set of logical models 205 or industry standardized frameworks for representing information within a particular enterprise. For example, in the financial services and banking industries, a portfolio credit exposure, exposure at default models or loss given default models may be used to identify a collection of terms to include in the information and services directory 115

Additionally, the analytics information and services directory 115 may specify mappings used to move data from one location to another (e.g., from an operational data store to a data warehouse or data mart) as needed for a particular analytics solution. For example, data staging and quality engines 235 may be configured to perform extract transform and load (ETL) processes to move data from an underlying operational data store into a data warehouse, data marts and/or OLAP cubes for use by a particular analytics solution. In such a case, the data staging and quality engines 235 may use the information and services directory 115 to map from a particular business term describing data needed of a data analytics application 230 to an actual source of the data, e.g., an operational data store.

Further, the analytics information and services directory 115 may certify an appropriateness of the data (as defined by the business level definitions) for use by the various analytics services in the directory. Similarly, the information and services directory 115 may certify the data transformation and movement functions needed to move the data from different operational data sources and external sources to a data warehouse, data mart, or OLAP cube are available. That is, the information and services directory 115 may certify that the provisioning required to access operational data corresponding to the business level definition is correct. The information and services directory 115 may also certify that the various data sources available in the directory 115 are appropriate for use by a given analytics service.

The analytics integration workbench 125 provides a compositional tool of the framework 105. In one embodiment, the analytics integration workbench 125 includes a canvas and palette used by a risk or data analyst to compose an analytics solution. Such a solution may reach across any aspect of the enterprise to obtain data described in the services directory 115 needed for the analytics solution. For example, a data analyst may compose a solution which presents a user interface dashboard reflecting a risk analysis performed using data pulled from multiple, disparate sources by the data staging and quality engines 235 within the enterprise and analyzed by the data analysis applications 230 using a variety of techniques (e.g., Monte Carlo or Cornish Fisher methods, etc).

The analytics integration workbench 125 may be used to compose a graphical representation of an analytics solution. In one embodiment, such an analytics solution is represented as a directed graph structure connecting the data sources and analytics services available from the analytics information and services directory 155 (and ultimately, from a variety of sources internal and external to the enterprise). Thus, a risk analyst composes analytics solutions using the standardized set of business terms from the data information and services directory 115. Further, the analytics integration workbench 125 may be configured to encode the graph structure representing a particular analytics solution as a text-based script 210 interpreted by the analytics integration server 135.

In turn, the analytics integration server 135 may parse the script 210 to perform a particular analytics task. In one embodiment, the analytics integration server 135 relies on the information and services directory 115 to resolve the business level references encoded in the script 210 into references to actual data sources in the data warehouse (provisioned using data staging and quality engines 235) and analyzed using the data analysis applications 230. For example, the analytics integration server 135 may be instructed by script 210 to obtain and move data from operational data stores to a data warehouse, obtain information from real time sources, and carry out the actual analytics processes using the data from the data warehouse (and/or real time sources) as specified for a particular solution. In one embodiment, the analytics integration server 135 may be instructed to monitor the states of various data sources within the enterprise and update the data used by a particular analytics solution as appropriate. Further, as described in greater detail below, the analytics integration server 135 may coordinate the activity of multiple disparate processes specified in the analytics solution.

Figure 3A:
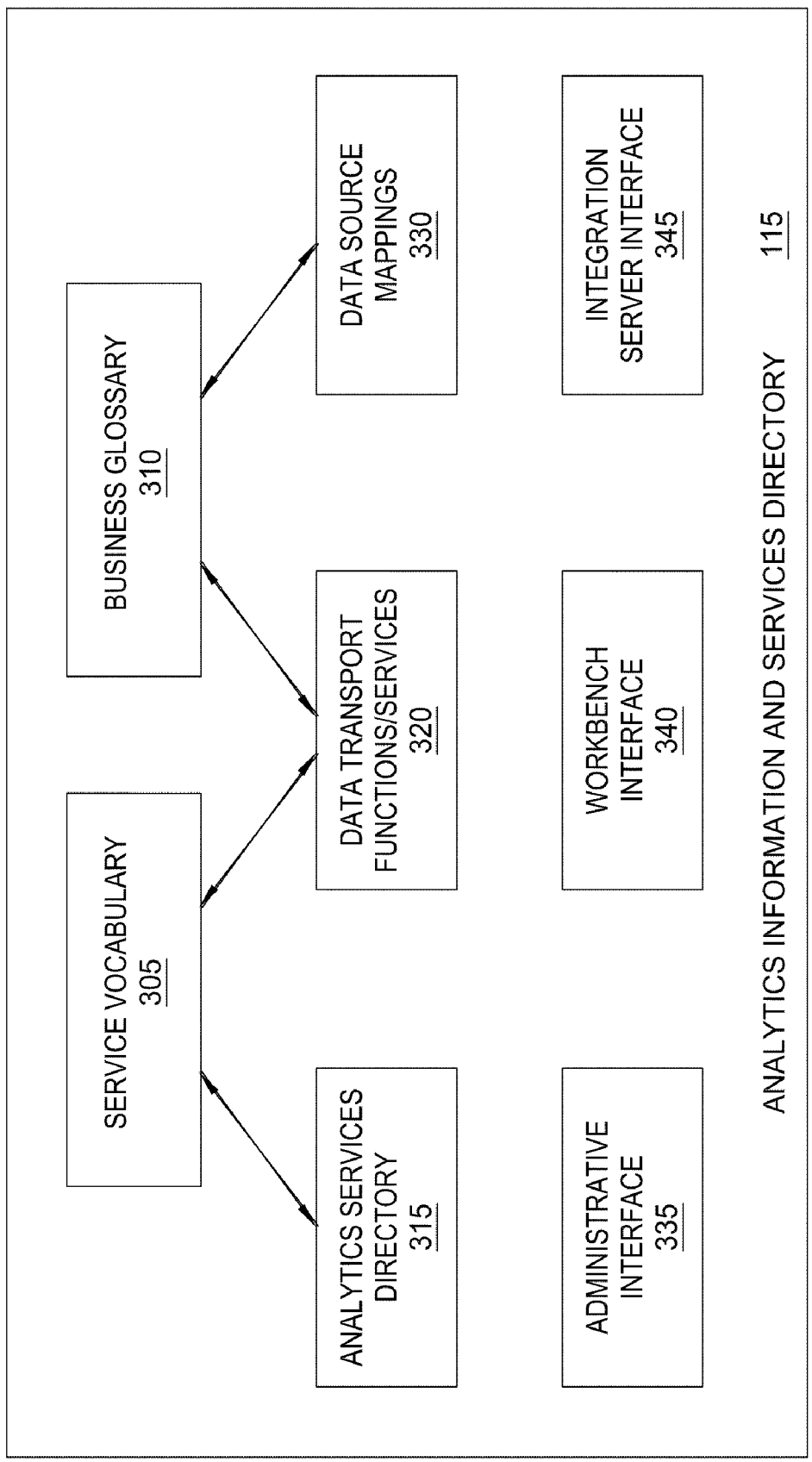

FIGS. 3A-3B further illustrate the analytics information and services directory 115, according to one embodiment of the invention. As shown, the information and services directory 115 includes a service vocabulary 305 and a business glossary 310. In one embodiment, the service glossary 305 provides a list of analytics tools that are available to evaluate data identified in the business glossary 310. As noted above, the analytics tools and the data sources may be referenced in service vocabulary 305 and the business glossary 310, respectively, using business level terms familiar to the risk analyst, and further, may be derived from industry framework models for a particular industry.

Illustratively, the information and services directory 115 includes an analytics services directory 315, a data transport functions/services 320, and data source mappings 330. The analytics services directory 315 may provide a mapping from a particular analytics tool listed in the service vocabulary 305 to an actual location and description of a process used to provide the named analytics service within the enterprise. For example, the analytics services directory 315 may include a web-services description language (WDSL) document indicating where and how to invoke a particular web service to perform a particular analytics operation on a specified data stream. Of course, a variety of other techniques may be used.

The data transport functions/services 320 may describe the data provisioning or data staging needed to move data from an operational data store (or real time data source) to a data warehouse, data mart(s), or OLAP cube. For example, the data transport functions/services 320 may specify a particular ETL process used to provision data corresponding to a term in the business glossary 310 or needed by an analytics service 305. Similarly, the data source mappings 330 may specify mappings from terms in the business glossary 310 to actual data sources.

As shown, the analytics information and services directory 115 may also include a collection of interfaces used by components of the framework 105 to provide a comprehensive framework for composing and executing analytics applications in business level languages. In this example, the information and services directory 115 includes an administrative interface 335, workbench interface 340 and an integration server interface 345. In one embodiment, the interfaces may each provide a collection of API calls allowing the information and services directory 115 to interact with other components of the framework. For example the administrative interface 335 may be used to update the service vocabulary 305 or business glossary 310 with new (or updated) analytical tools or terms available to the risk analyst for composing an analytics solution for a given enterprise or to update the mappings from either the service vocabulary 305 or the business glossary 310 to any of the analytics services directory 315, the data transport functions/services 320, or the data source mappings 330.

The workbench interface 340 may include a set of routines used by the analytics integration workbench 125 to present a palette of items from the service vocabulary 305 and/or business glossary 310 to a risk analyst composing an analytics solution. Similarly, the integration server interface 345 may include a set of routines used by the analytics integration server 135 to obtain the location and invocation mechanism (e.g., a WSDL based description) for an analytics service listed in the services vocabulary 305. The integration server interface 345 may also specify the appropriate ETL processes to invoke in order to move and/or provision data for such an analytics service included in a given analytics solution.

FIG. 3B illustrates an example of the analytics services directory 315, data transport functions/services 320, and data source mappings 330. As shown, each of these components is represented using a table mapping a term from the business glossary (represented by the "BG" columns) to an underlying data stream. For example, a row 350 of the data source mappings 330 maps an "interest rate swap" to a physical store of "Swab DB", a row 355 maps a value "LIBOR" (London Interbank Offered Rate) to a real time data feed named "Bloomberg." Finally, a row 360 maps a business glossary term of "10-year treasury" to a physical data store of "Bond Desk." The data transport functions/services 320 maps terms from the business glossary (represented buy the "BG" column) to a source and target data store, as well as provides a "move function process" used to move data from the source to the target data store. That is, the data transport functions/services 320 reference an ETL process used to provision data corresponding to a particular term in the business glossary in a data warehouse, data mart(s) or OLAP cube. For example, the business glossary 310 term of "ISwaptoVar" specifies a source store of "swap DB", a target store of "BDW" (short for banking data warehouse) and a move function of "direct copy." As noted above, the analytics services directory 315 may provide a mapping from a particular analytics tool listed in the service vocabulary 305 (e.g., for row 370, a "C-F var" function) to an actual location. For example, as shown in FIG. 3B, data analyzed using the "C-F var" function should be stored in the "BDW" repository.

Figure 4A:
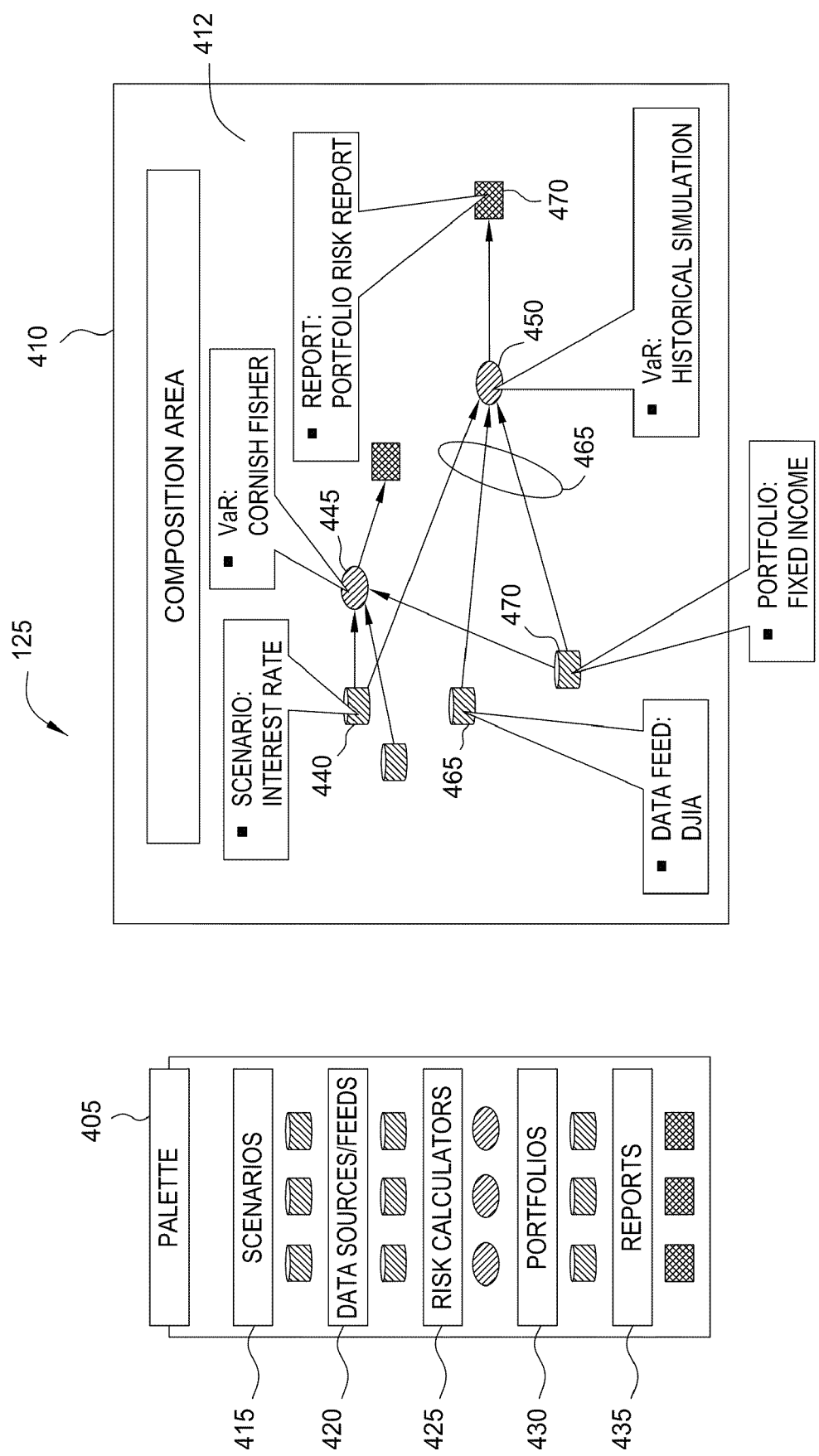
FIGS. 4A-4B further illustrate the analytics integration workbench, according to one embodiment of the invention.
Figure 4B:
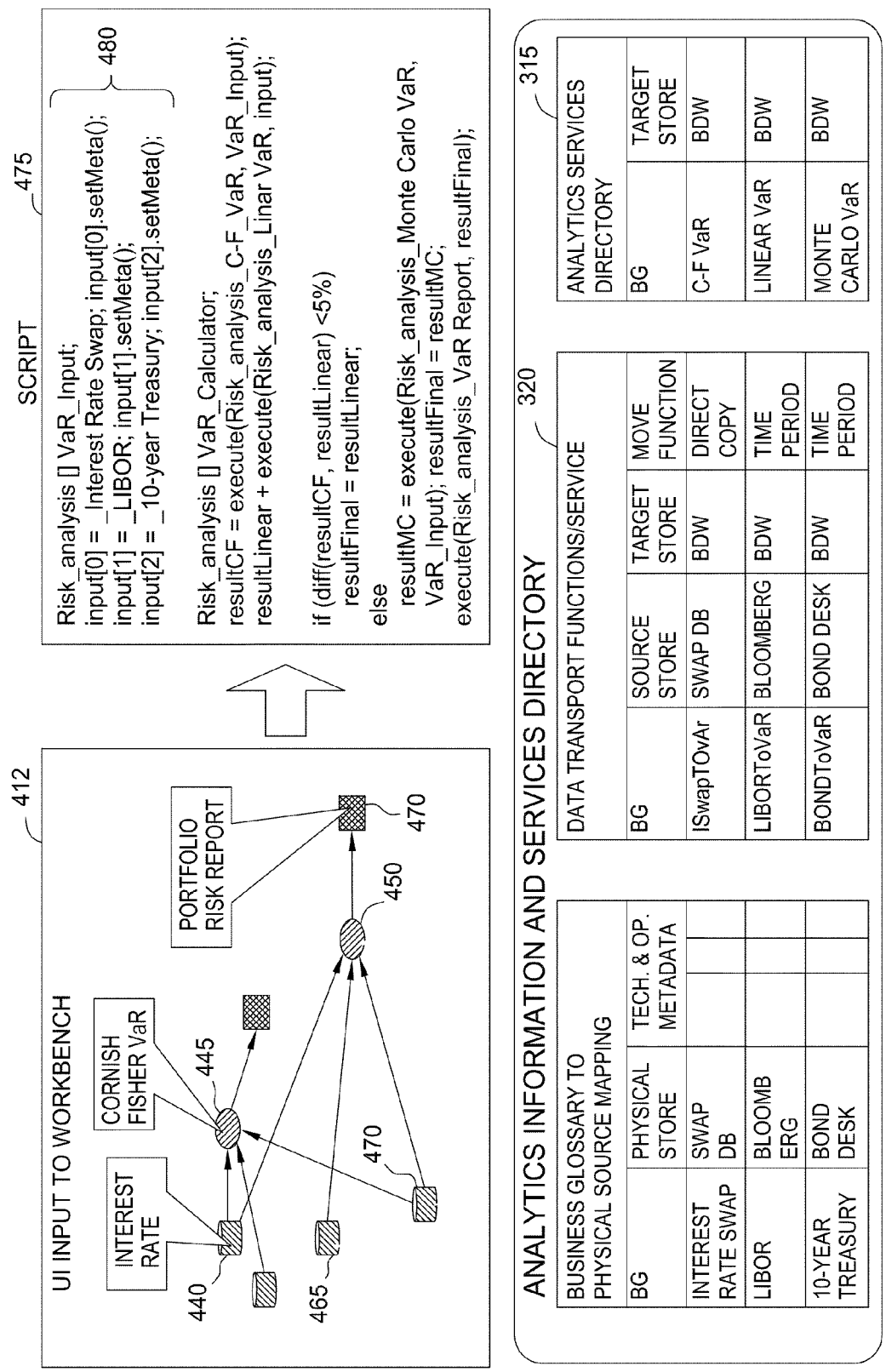

FIGS. 4A-4B further illustrate the analytics integration workbench 125, according to one embodiment of the invention. In this example, the analytics integration workbench 125 is represented as including a graphical interface which displays a palette 405 and a composition area 410. Illustratively, the palette 405 includes a variety of elements from the service vocabulary 305 and the business glossary 310 which may be included in a particular analytics solution. In particular, palette 405 presents a business level view of analytics information (disks), risk assessment algorithms (ovals), and risk reports (rectangles) to the risk analyst. Scenarios 415 may be used to define a set of operational parameters for an analytics solution. For example, the scenarios 415 may be selected to introduce data such as an interest rate, a market index, or a currency exchange rate for use in an analytics solution.

Data sources/data feeds 420 may include any of the data sources within an enterprise as well as external data sources or feeds. For example, in addition to any internal source of structured, unstructured or semi-structured information within the enterprise, real time external sources such as market data feed may be represented by icons in the data sources/data feeds 420. For example, the data sources/data feeds 420 could include references to public and/or subscription real time data streams, e.g., stock market indexes (e.g., the Dow Jones Industrial average, NASDAQ, or Bloomberg feeds). Risk calculators 425 generally correspond to items listed in the service vocabulary 305 of the analytics information and service directory 115. Examples include historical simulations, Cornish Fisher, Monte Carlo simulations, and any other analytics process or simulation appropriate for the needs of a given case. Portfolios 430 correspond to information defined in the business glossary 310 for a particular enterprise. In particular, the portfolios 430 may describe assets of the enterprise to be evaluated using a particular analytics tool. Common examples for a financial services enterprise include a fixed income portfolio or a forward contract portfolio. Lastly, reports 435 may provide a desired standard structured presentation of the results of a risk calculations or analytics solutions. Like the other information selectable in the palette 405, the reports may be structured according to terms form the business glossary 310, which themselves may be modeled on common or standardized reports for a particular business entity. For example, for the financial services industry, common examples of a standard report could include a portfolio risk report or a trade risk report.

As shown in FIG. 4A, the composition area 410 includes an analytics solution 412 composed from elements of the palette 405. The analytics solution 412 is displayed within the composition area 410 as a directed graph structure connecting the data sources/data feeds and the risk calculators 425, etc., selected from the palette 405. For example, a scenario 440 of "interest rate" is passed as input to two of the risk calculators 425. Specifically, a Cornish Fisher simulation 445 and a historical simulation 450. The historical simulation 450 also receives a data feed 465 of "DJIA" and a portfolio 470 of Fixed Income (as represented by a set of arrows 465). Further, the output of the historical simulation 450 is presented as a report 470 named "Portfolio Risk Report."

FIG. 4B further illustrates the analytics solution 412 composed using the analytics integration workbench 125. Specifically, FIG. 4B illustrates the relationship between the analytics information and services directory 115, the analytics solution 412, and a script 475. In one embodiment, the script 475 is generated by traversing the directed graph composed using the analytics integration workbench 125, i.e., by traversing the analytics solution 412. For example, the analytics solution 412 includes a scenario 440 (an interest rate), a data feed 465 (a DJIA data feed), and a portfolio 470 (a fixed income portfolio). Correspondingly, the script 475 includes three input statements 480. In one embodiment, elements in the palette 405 map to entries in the services directory 305 and business glossary 310. Further, such references are resolved in the integration server 135 to actual data sources, data feeds, and analytics in the script 475, using information obtained from the analytics information and services directory 115.

Figure 5:
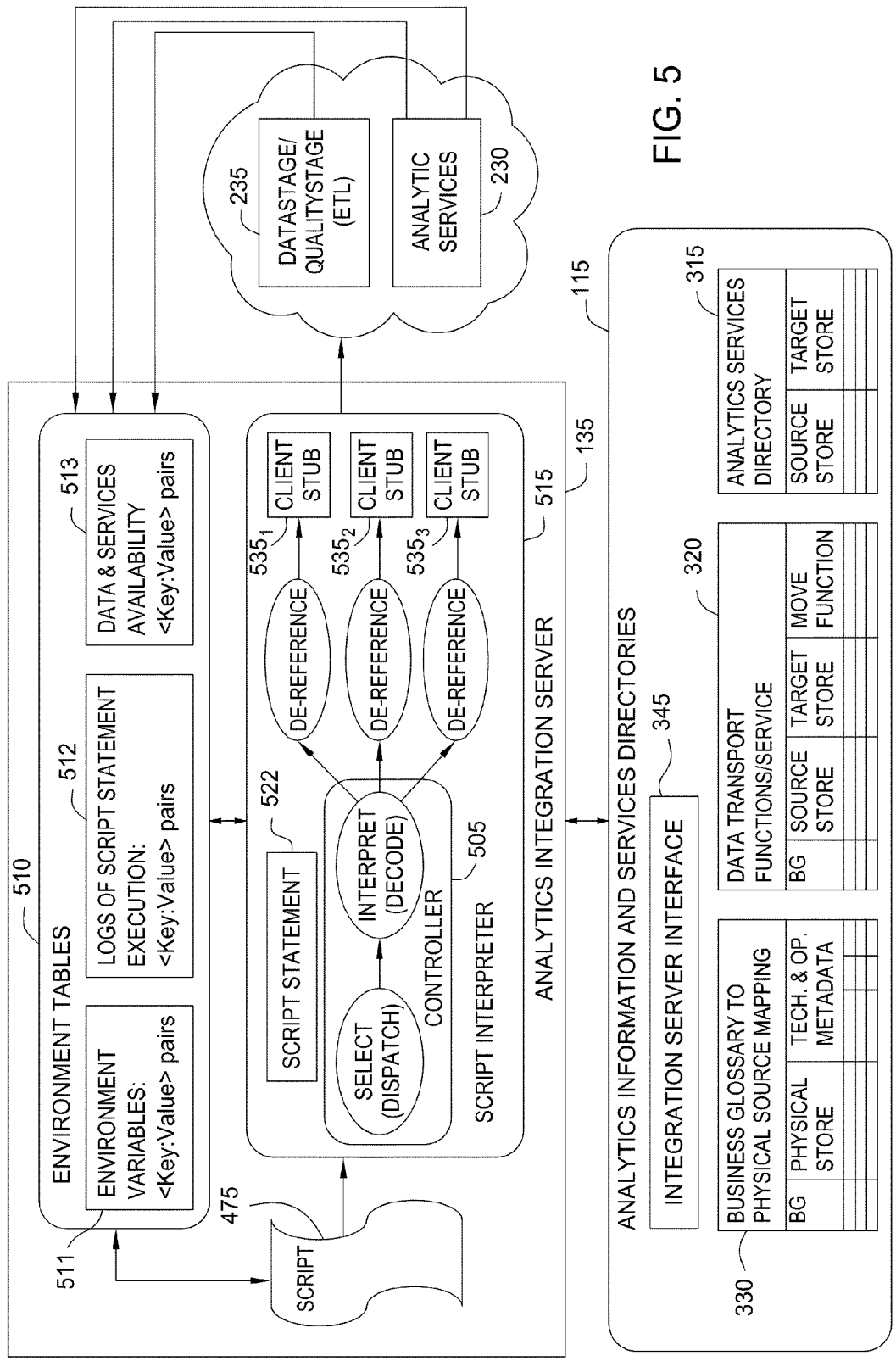
FIG. 5 further illustrates the analytics integration server, according to one embodiment of the invention.

FIG. 5 further illustrates the analytics integration server 135, according to one embodiment of the invention. As shown, the analytics integration server 135 interacts with the analytics Information and services directories 115 to execute a script 475. Illustratively, the analytics integration server 135 includes a set of environment tables 510 and a script interpreter 515. In one embodiment, the script interpreter 515 is supplied a script 475 for execution. As described above, the script 475 may be generated from a graphical representation of an analytics solution composed using the integration workbench 125 (e.g., the analytics solution 412 shown in FIGS. 4A-4B). In other embodiments, users may compose and edit script 475 as needed for a particular case in other ways. Once received, the controller 505 may be configured to orchestrate the execution of the script 475 and the presentation of the results of script execution to a user (e.g., a risk analyst).

In one embodiment, a status of script execution is reflected in environment tables 510. For example, as shown, the environment tables 510 include environment variables 511, logs 512, and data and services availability 513. Each of the environment variables 511, the logs 512, and the data and services availability 513 may be represented as a collection of <key: value> pairs. The environment variables 511 may represent exception events which should result in the interruption of a script as it is being executed. For example, returning to the analytical solution 412, one of the inputs to the historical simulation 450 is an interest rate value 440. In such a case, one of the environment variables 511 could include the current value for the interest rate used in the analytical solution 412. If the value for such an interest rate changes during script execution, then the script interpreter 515 could interrupt the script and re-execute any portion of the script 475 which relied on the value of this environment variable 511.

The logs 512 represent a log of statements of the script 475 that have been successfully executed. Again, using the analytics solution 412 and script 475 as an example, the first three statements of the script 475 correspond to the inputs needed for the historical simulation 450. In such a case, when the script 475 is executed, statements in the log representing the completion of the provisioning of input data sources 440, 465, and 470 may result in the script interpreter 515 selecting to execute the statements in the script 475 which invoke the historical simulation 450. Note, each of the three input statements may be executed in parallel, along with any other statements in the script that do not depend on the results of the input statements for execution. Thereafter, statements may be added to the log 512 indicating that the historical simulation 450 is complete. In response, the script interpreter 515 may select the statements in the script used to generate the report from the results of the historical simulation 450. As a given analytics solution may include a variety different paths of execution, multiple processes (e.g., rick calculators 425) may be executing concurrently with one another. Thus, the script interpreter 515 may orchestrate the execution of a variety of processes to carry out a particular analytics solution using the environment tables 510. Services availability 513 may indicate the status of a given data source or data feed. In the case a needed data source or feed is unavailable, then any statements in the script 475 that depend on that source or feed may block until the data source or feed again becomes available and an alternative to those statements may be executed instead.

As shown, the controller 505 may select one or more script statements 522 from the script 475 as they become ready to execute, based on the environment tables 510. Once selected, the controller 505 may interpret (i.e., decode) the script statement by communicating with the analytics and information serves 115, e.g., through the integration server interface 345 mentioned above. That is, the controller 505 may dereference any references to terms from the service vocabulary 305 or business glossary 310 to an actual data source, process instantiation, or service descriptions corresponding to the business level terms provided the services directory 115.

For example, FIG. 5 shows the controller 505 dereferencing three elements from script statements 522. In turn, each de-referenced statement is supplied to a respective client stub $535_{1-3}$. Each client stub $535_{1-3}$ may provide one side of a remote procedure call (RPC). That is, the client stubs $535_{1-3}$ allow the script interpreter 515 (as a client) to remotely call procedures on a remote computer (as a server). When invoked, the client stub 535 may itself invoke a RPC, web-service, or other remote process, and receive the results of remote execution. For example, as shown, the client stubs $535_{1-3}$ may invoke data staging or quality engines 235 within an enterprise, e.g., an ETL process used to obtain and move data from operational data stores to a data warehouse, data marts, or OLAP cube, as needed for an analytic service 230 (e.g., an instantiation of any of the analytics tools provided in the service vocabulary 305). In such a case, the result returned to a client stub 535 may be an indication that a data staging operation is complete. Similarly, for an analytic service 230, the results returned to a client stub 535 may be an indication that the analytic service has completed execution. Alternatively, the results of the analytic service 230 may be returned to the controller 505 and the script interpreter 515. In such a case, the results may be used as input for another one of the client stubs 535.

Figure 6:
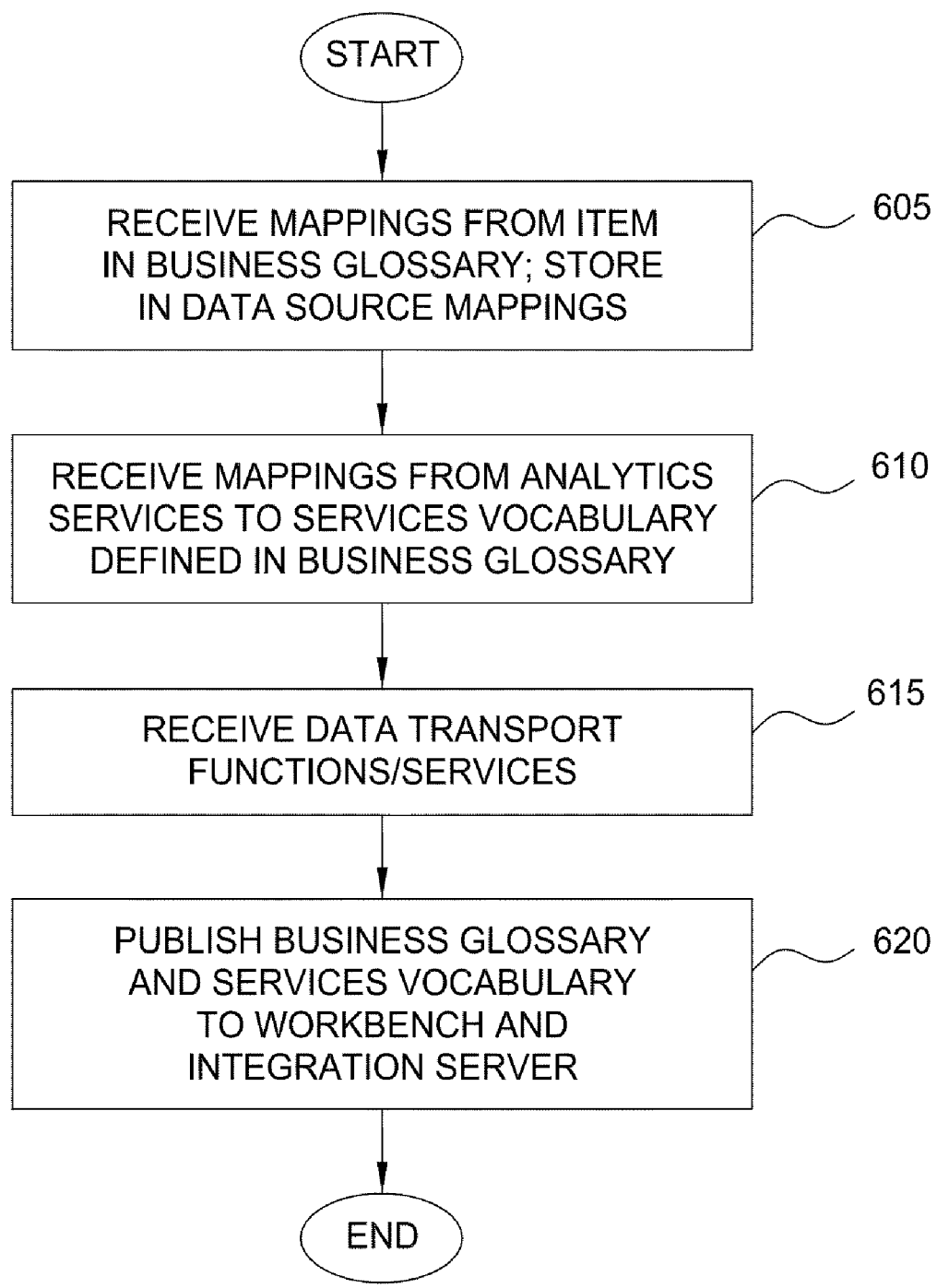
FIG. 6 illustrates a method for generating the service vocabulary and business glossary of the analytics Information in the analytics information and services directory, according to one embodiment of the invention.
Figure 7:
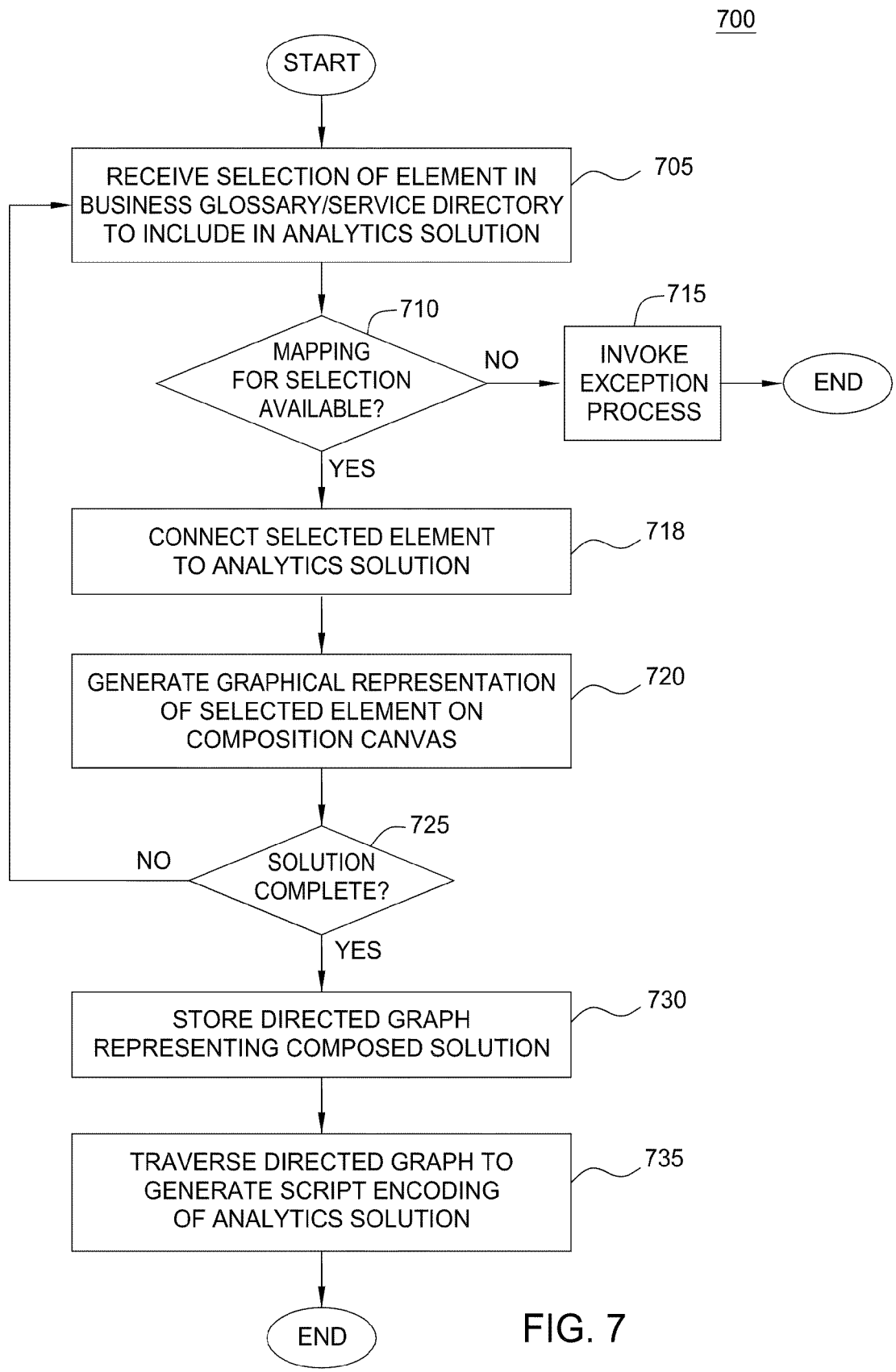
FIG. 7 illustrates a method for the analytics integration workbench to generate an analytics solution in response to user input, according to one embodiment of the invention.
Figure 8:
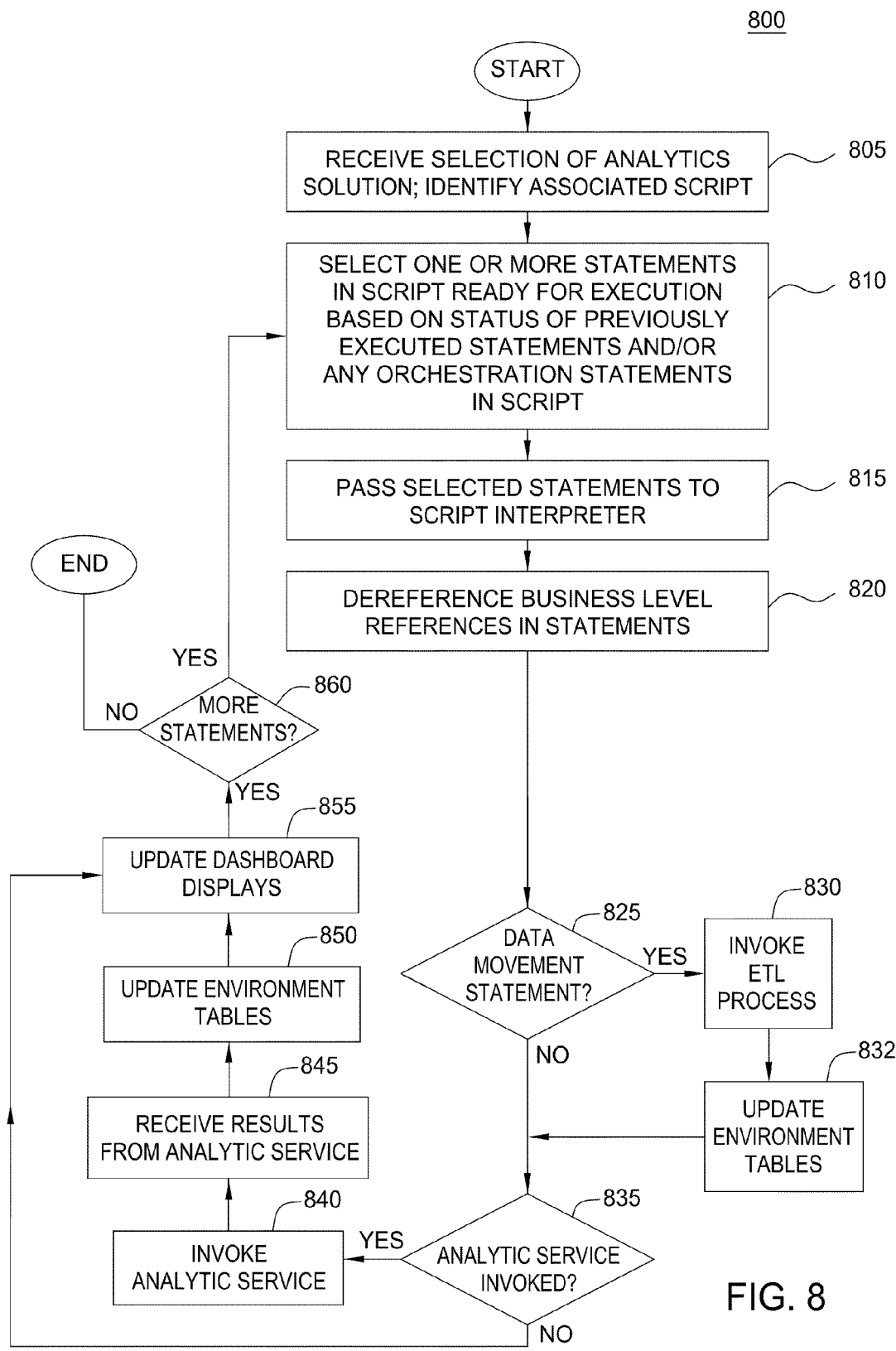
FIG. 8 illustrates a method for the analytics integration server to interpret and execute a script generated by the analytics integration workbench, according to one embodiment of the invention.

FIGS. 6-8 are flow diagrams illustrating methods performed by the analytics information and services directory 115, the analytics integration workbench 125, and the analytics integration server 135. First, FIG. 6 illustrates a method 600 for generating the vocabulary service 305 and business glossary 310 of the analytics information and services directory 115, according to one embodiment of the invention. As shown, the method 600 begins at step 605 where the analytics information and services directory 115 receives mappings from elements in a business glossary to a corresponding data source, typically from metadata repositories of information integration tools. For example, as noted above, data sources, data feeds, both internal and external to an enterprise may be mapped to terms in industry standard models. The mappings may be stored as data source mappings 330.

At step 610, the analytics information and services directory 115 receives mappings from analytics services to defined services vocabulary terms. At step 615, the analytics information and services directory 115 may receive data transport functions/services needed for a particular data source or analytical service mapped to a business level glossary term or service vocabulary element defined at steps 605 or 610. For example, a data analyst may evaluate an eEnterprise networking infrastructure to trace form terms and analytics tools in the glossary to the actual underlying data sources where data corresponding to a term may be found or where the instantiation of a given analytics tool is made available. The data transport functions/services specify the appropriate extract transform and load (ETL) processes used to move data from an a given operational data store or data feed into a data warehouse, data marts and/or OLAP cubes as specified by data source mappings or used to move data as needed for a given analytic service. At step 620, the information and services directory 115 may publish the service vocabulary 305 and the business glossary 310 to the workbench 125 and the integration server 135. Thus, the service vocabulary 305 and the business glossary 310 reference the data sources and analytic tools available to include in a given analytics solution. Further, once published the workbench 125 and the integration server 135 may interact with the analytics information and services directory 115 to present a palette used to compose an analytics solution using the business level terms provided by the service vocabulary 305 and the business glossary 310 (in the case of the workbench 125) and to identify the needed ETL processes and analytic services to invoke when executing a given analytics solution. Steps 605, 610, and 615 can performed in any sequence, and repeatedly over time.

FIG. 7 illustrates a method 700 for the analytics integration workbench 125 to generate an analytics solution in response to user input, according to one embodiment of the invention. As shown, the method 700 begins at step 705 where the analytics integration workbench 125 receives a selection of an element in the business glossary 305 or service directory 310 to include an analytics solution. At step 710 the analytics integration workbench 125 may determine whether a mapping for the selected element is available from the information and services directory 115, i.e., whether the business level terms in the business glossary 305 or service directory 310 may be resolved to a physical instantiation of a data source, feed process or service. If not, then at step 715, an exception process may be invoked. In such a case, new mappings are added to the information and services directory 115 to account for the business level term that resulted in the exception process being invoked.

At step 715, the user may connect a selected element to an analytics solution being composed on the composition area of the workbench 125. For example, the user may select to supply data (as represented by a business level term form the business glossary) to an analytics process (as represented by a risk calculator). Similarly, the output of the analytics process may be connected to other analytic tools, to a data store (e.g., a data warehouse) or to a presentation or report supplied to the user (e.g., a dashboard display that updates as data changes over time). Once the user completes composing an analytics solution, at step 720, the integration workbench 125 may generate a graphical representation of the selected element, connected to the analytics solution being composed as specified, and present it on the composition canvas. In one embodiment, the integration workbench 125 may validate the connections in a solution being composed to prevent a user from composing a non-functioning solution (e.g., an analytics solution with repeating loops or one in which an analytic service is not provided with a required input). At step 725, if the user has not completed composing the analytical solution, then the method returns to step 705 where additional elements may be added to the analytics solution being composed. Once complete, at step 730, the integration workbench 125 may store a directed graph representing the analytical solution. At step 735, the workbench 125 may traverse the directed graph to generate a text based script encoding of the analytics solution. The palette in the workbench may include special tools to organize the information received from the information and services directory 115 and present it to the risk analyst in an intuitively navigate-able hierarchy.

FIG. 8 illustrates a method 800 for the analytics integration server 135 to interpret and execute a script generated, e.g., by the analytics integration workbench 125 or by a user, according to one embodiment of the invention. As shown, the method 800 begins at step 805, where the analytics integration server 135 receives a selection of an analytics solution to execute and a script associated with that analytics solution (e.g., in response to a user input). At step 810, the controller 505 in the integration server 135 selects one or more statements in the script which are ready for execution, based on a status of previously executed statements (if any) and/or any orchestration statements in the script.

At step 815, the statements selected at step 810 may be passed to a controller 505 of the script interpreter 515. And in response, at step 820, the controller 505 may dereference one or more business level references in the selected statements. For example, the script interpreter may interact with the information and services directory 115 to obtain mappings from the business level references in the statements to the underlying data and process infrastructure. Once the mappings are obtained, the script interpreter may execute the script statement, e.g., by invoking a client stub of an RPC call. Accordingly, at step 825, if the statement is a data movement statement, then at step 825, the script interpreter may invoke an ETL process to move data from one source (e.g., an operational data store or an external data feed) into a data warehouse, data mart(s), or an OLAP cube. At step 832, the results of the data movement statement may be used to update the environment tables maintained by the integration server 135.

At step 835, if the statement is an analytic service, e.g., to execute a Monte Carlo or a Cornish Fisher method, etc., then at step 840, the script interpreter may invoke the analytic service referenced in the de-referenced statement, e.g., by invoking a client stub of an RPC call. At step 845, the script interpreter may receive the results of the invoked analytic service. And at step 850, the results of the invoked analytic service may be used to update the environment tables maintained by the integration server 135. Further, at step 855, the results of the analytic service may be formatted in a report or used to update a dynamic dashboard display, e.g., a dashboard display presented to a risk analyst. Alternatively, or additionally, depending on the particular script, the results of the analytic service may be supplied as the inputs to another analytic service or to an ETL process used to store the results of the invoked analytic service in the data warehouse.

At step 860, the script interpreter may determine whether more statements remain in the script being executed. If not, then the method 800 terminates. Otherwise, the method 800 returns to step 810, where the integration server identifies statements in the script are ready for execution, based on the status of previously executed statements. Note, in one embodiment, a script representing a particular analytics solution may not have an expressed ending point. That is, a script may be configured to run continuously until terminated by a user. In such a case, the script may run continuously to execute the ETL processes to update data in the data warehouse, data mart(s), or an OLAP cube as well as perform the analytic services specified in such a script.

Figure 9:
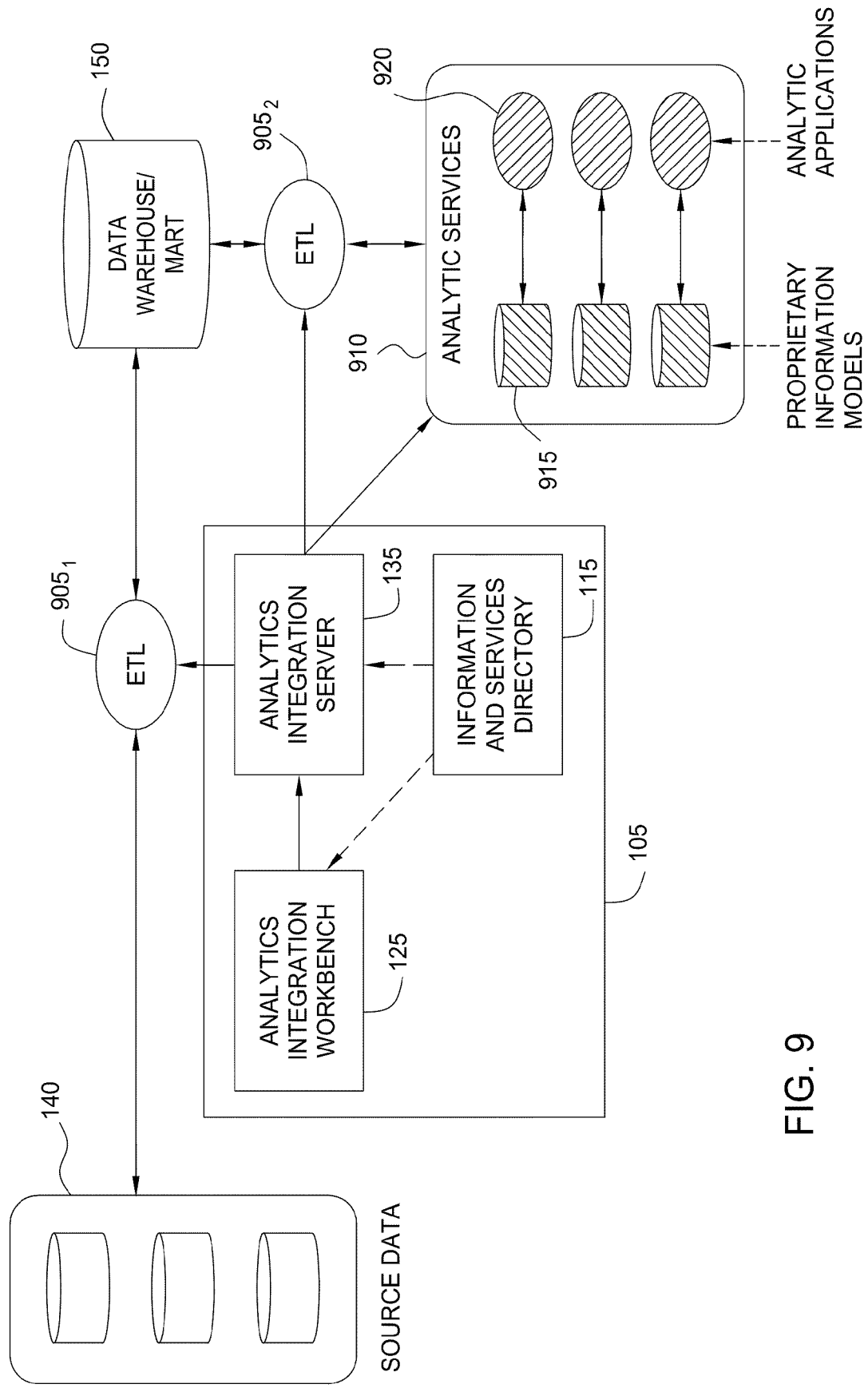
FIG. 9 is a block diagram illustrating an example of the framework for composing and executing analytics applications in business level languages executing a script, according to one embodiment of the invention.

FIG. 9 is a block diagram illustrating an example of the framework 105 executing an analytics applications composed in business level languages, according to one embodiment of the invention. As shown, the analytics integration server 135 may invoke ETL processes $905_1$ to move information from the source data 140 into the data warehouse/data mart(s) 150. Once data is provisioned, the analytics integration server 135 may invoke analytic service 910 to evaluate data in the data warehouse/data mart(s) 150. As noted, the analytic services specified in a solution composed using the workbench 125 using business level languages may map to a variety of analytic applications 920. In one embodiment, some of the analytic services may be provided using an underlying analytic application 920 that relies on its own proprietary information model 915. In such a case, the integration server 135 may invoke ETL processes $905_2$ to map data from the data warehouse/data mart(s) 150 to a given application 920. Similarly, the analytics integration server 135 may invoke additional ETL processes $905_2$ to map the results form such an analytics application back to the data warehouse/data mart(s) 150, where it is available to be included in reports presented to a user and as input to further components of an analytic solution being executed by the framework 105.

Advantageously, embodiments of the invention provide systems and methods for building and executing analytics solutions. Such a solution may provide a comprehensive analytics solution (e.g., a risk assessment, fraud detection solution, dynamic operational risk evaluations, regulatory compliance assessments, etc.). The analytics solution may perform an analytics task using operational data distributed across a variety of independently created and governed data repositories in different departments of an organization. That is, embodiments of the invention provide a framework which allows users (e.g., a risk analyst) to compose analytical tools that can access data from a variety of sources (both internal and external to an enterprise), analytics services form a variety of internal and external sources, and perform a variety of analytic functions. As described above, in one embodiment, the framework includes three components: an analytics Information and services directory, an analytics integration workbench, and an analytics integration server.

While the foregoing is directed to embodiments of the present invention, other and further embodiments of the invention may be devised without departing from the basic scope thereof, and the scope thereof is determined by the claims that follow.

What is claimed is:

1. A computer-implemented method for executing an analytics solution expressed in a business level language, the method comprising:
   receiving a script generated from the analytics solution expressed in the business level language, wherein the script includes a plurality of references to elements listed in a business glossary, wherein the business glossary includes a plurality of elements of an industry standard framework for representing information within a given enterprise, the elements being mapped to underlying data sources and analytics services available to the enterprise, wherein the elements listed in the glossary specify data resources available from within an enterprise network infrastructure independently from the underlying data sources, and wherein at least one of the underlying data sources comprises a real time data feed available from within the enterprise network infrastructure;
   identifying one or more statements in the script ready for execution;
   dereferencing, in the identified one or more statements, each reference to elements from the business glossary, wherein at least a first reference is to an element in the business glossary associated with a mapping specifying a function invoked to move data from one of the underlying data sources to a target data store, and wherein at least a second reference is to an analytics tool listed in the business glossary configured to operate on the moved data, wherein the second reference is associated with a mapping specifying an instantiation of the analytical tool provided within an enterprise network infrastructure, wherein the analytics tools in the business glossary identify analytics methods available from within the enterprise network infrastructure independently from the analytics tools used to provide the analytics methods; and
   executing, by operation of a processor, the identified one or more statements, wherein the execution includes:
   invoking the function to move the data, and
   executing the instance of the analytics tool to operate on the moved data.

2. The computer-implemented method of claim 1, wherein the one or more statements are identified based on a status of previously executed statements in the script.

3. The computer-implemented method of claim 1, wherein executing the identified one or more statements comprises one of invoking a remote procedure call and a web-service.

4. The computer-implemented method of claim 1, wherein the function invoked to move the data from the underlying data source to a target data store provisions the data for use by the analytics solution.

5. The computer-implemented method of claim 4, wherein the target data store is one of a data warehouse, a data mart, and an OALP data cube.

6. The computer-implemented method of claim 1, wherein the underlying data source comprises an operational data store within the enterprise network infrastructure, and wherein the function invokes an extract, transform, and load process configured to move the data from the operational data store to the target data store.

7. A non-transitory computer-readable storage medium containing a program which, when executed by a processor, performs an operation for executing an analytics solution expressed a business level language, the operation comprising:
   receiving a script generated from the analytics solution expressed in the business level language, wherein the script includes a plurality of references to elements listed in a business glossary, wherein the business glossary includes a plurality of elements of an industry standard framework for representing information within a given enterprise, the elements being mapped to underlying data sources and analytics services available to the enterprise, wherein the elements listed in the glossary specify data resources available from within an enterprise network infrastructure independently from the underlying data sources, and wherein at least one of the underlying data sources comprises a real time data feed available from within the enterprise network infrastructure;
   identifying one or more statements in the script ready for execution;
   dereferencing, in the identified one or more statements, each reference to elements from the business glossary, wherein at least a first reference is to an element in the business glossary associated with a mapping specifying a function invoked to move data from one of the underlying data sources to a target data store, and wherein at least a second reference is to an analytics tool in the business glossary configured to operate on the moved data, wherein the second reference is associated with a mapping specifying an instantiation of the analytical tool provided within an enterprise network infrastructure, wherein the analytics tools in the business glossary identify analytics methods available from within the enterprise network infrastructure independently from the analytics tools used to provide the analytics methods; and
   executing, by operation of a processor, the identified one or more statements, wherein the execution includes:
   invoking the function to move data, and
   executing the instantiation of the analytics tool to operate on the moved data.

8. The non-transitory computer-readable storage medium of claim 7, wherein the one or more statements are identified based on a status of previously executed statements in the script.

9. The non-transitory computer-readable storage medium of claim 7, wherein executing the identified one or more statements comprises one of invoking a remote procedure call and a web-service.

10. The non-transitory computer-readable storage medium of claim 7, wherein the function invoked to move the data from the underlying data source to a target data store provisions the data for use by the analytics solution.

11. The non-transitory computer-readable storage medium of claim 10, wherein the target data store is one of a data warehouse, a data mart, and an OALP data cube.

12. The non-transitory computer-readable storage medium of claim 7, wherein the underlying data source comprises an operational data store within the enterprise network infrastructure, and wherein the function invokes an extract, transform, and load process configured to move the data from the operational data store to the target data store.

13. A system, comprising:
one or more computer processors; and
a memory containing a program, which when executed by the one or more computer processors is configured to perform an operation for composing an analytics solution, the operation comprising:
receiving a script generated from the analytics solution expressed in the business level language, wherein the script includes a plurality of references to elements listed in a business glossary, wherein the business glossary includes a plurality of elements of an industry standard framework for representing information within a given enterprise, the elements being mapped to underlying data sources and analytics services available to the enterprise, wherein the elements listed the glossary specify data resources available from within an enterprise network infrastructure independently from the underlying data sources, and wherein at least one of the underlying data sources comprises a real time data feed available from within the enterprise network infrastructure,
identifying one or more statements in the script ready for execution,
dereferencing, in the identified one or more statements, each reference to elements from the business glossary, wherein at least a first reference is to an element in the business glossary associated with a mapping specifying a function invoked to move data from one of the underlying data sources to a target data store, and wherein at least a second reference is to an analytics tool in the business glossary configured to operate on the moved data, wherein the second reference is associated with a mapping specifying an instantiation of the analytical tool provided within an enterprise network infrastructure, wherein the analytics tools in the business glossary identify analytics methods available from within the enterprise network infrastructure independently from the analytics tools used to provide the analytics methods, and
executing, by operation of a processor, the identified one or more statements, wherein the execution includes:
invoking the function to move data; and
executing the instantiation of the analytics tool to operate on the moved data.

14. The system of claim 13, wherein the one or more statements are identified based on a status of previously executed statements in the script.

15. The system of claim 13, wherein executing the identified one or more statements comprises one of invoking a remote procedure call and a web-service.

16. The system of claim 13, wherein the function invoked to move the data from the underlying data source to a target data store provisions the data for use by the analytics solution.

17. The system of claim 16, wherein the target data store is one of a data warehouse, a data mart, and an OALP data cube.

18. The system of claim 13, wherein the underlying data source comprises an operational data store within the enterprise network infrastructure, and wherein the function invokes an extract, transform, and load process configured to move the data from the operational data store to the target data store.

* * * * *